(12) United States Patent
Busschaert et al.

(10) Patent No.: US 6,471,032 B2
(45) Date of Patent: Oct. 29, 2002

(54) ELEVATOR FOR BULK MATERIAL AND RELATED APPARATUSES

(75) Inventors: Bart Busschaert, Proven (BE); Bart Marie Antoon Missotten, Leuven (BE); Serge Odon Deleersnyder, Ruddervoorde (BE); Cyriel Richard Jozef De Busscher, Damme (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/896,574

(22) Filed: Jun. 29, 2001

(65) Prior Publication Data

US 2002/0002868 A1 Jan. 10, 2002

(51) Int. Cl.$^7$ .............................................. B65G 21/10
(52) U.S. Cl. ....................... 198/312; 198/300; 198/813; 73/861.73
(58) Field of Search .................... 198/300, 312, 198/510.1, 515, 810.04, 813; 56/10.2 R; 73/861.73

(56) References Cited

U.S. PATENT DOCUMENTS

| | | | | | |
|---|---|---|---|---|---|
| 3,638,812 A | * | 2/1972 | Ryczek | .................... | 198/312 X |
| 3,700,383 A | * | 10/1972 | Boersma | ................. | 198/312 X |
| 4,765,190 A | * | 8/1988 | Strubbe | ................... | 73/861.73 |
| 5,736,652 A | | 4/1998 | Strubbe | | |
| 5,952,584 A | | 9/1999 | Strubbe | | |
| 5,959,218 A | | 9/1999 | Strubbe | | |

* cited by examiner

Primary Examiner—James R. Bidwell
(74) Attorney, Agent, or Firm—John William Stader; Larry W. Miller

(57) ABSTRACT

An elevator for bulk material includes an elevator head that mounts a mass flow measuring device. The elevator head also supports the upper sprocket of the elevator. The elevator head is pivotable thereby permitting adjustment of the elevator chain tension without altering the spatial relationship between the elevator paddles, the top of the elevator head and the sensor surface of the mass flow measuring device.

21 Claims, 5 Drawing Sheets

ELEVATOR FOR BULK MATERIAL AND RELATED APPARATUSES

BACKGROUND OF THE INVENTION

1. Field of Invention

This invention relates to an elevator for bulk material, and related apparatuses, in particular but not exclusively for use in harvesting machines, grain silos and hoppers.

2. Background of Prior Art

An example of the mass flow or bulk flow of so-called "bulk material" is the flow of grain to the grain tank in a combine harvester. It is known to provide a flow meter that operates by measuring forces of this flow on a sensor surface. Such flow meters may also be employed in hoppers, silos, harvesting and cutting machinery other than combine harvesters, conveying machinery and various kinds of manufacturing and medical apparatuses.

Bulk flow may also embrace, e.g. the flow of bulk grain and chemicals in transport vehicles (such as tankers, ships and railway tanker wagons); the flow of e.g. powders, and materials of larger particle size such as fruit, vegetables, coal, minerals and ores; and even the flow of liquids of high viscosity. Thus the invention may be of use in the elevating of liquids whose viscosity changes over time. In general terms, bulk flow of material may in this context be regarded as any flow of matter in contact with a surface, in which the effects of friction between the surface and the material usually influence the maximum flow rate, and in which the matter exhibits free flow behaviour.

U.S. Pat. No. 5,959,218 includes a discussion of the applications of mass flow meters, for measuring the mass flow rate of bulk materials, in the combine harvester art; and also a discussion of some prior art mass flow meters. The entire description of U.S. Pat. No. 5,959,218 is incorporated herein by reference.

The arrangement of U.S. Pat. No. 5,959,218 is a highly successful apparatus for measuring the mass flow rate of grains in a combine harvester, without reducing or interrupting the flow of grains. The invention seeks to provide additional advantages over those arising from mass flow meters such as, but not limited to, the U.S. Pat. No. 5,959,218 arrangements and methods.

In a combine harvester the grain elevator lifts grain between the grain cleaner and the bubble up auger that in turn transfers the grain to the grain tank. As a result of use of a combine harvester during a harvesting season, the chain defining a major part of the grain elevator stretches and slackens.

The chain is usually an endless ovaloid or similar shape that is wrapped at its lower and upper ends around, respectively, a drive sprocket (at the lower end of the elevator) and a tensioning (driven) sprocket (at the upper end of the elevator). It is therefore conventional to include a releasably securable mounting, for the tensioning sprocket, that is position adjustable e.g. in a direction parallel to the elongate axis of the ovaloid. The combine harvester operator or service engineer may release the mounting in order to take up slack in the chain, by repositioning the tensioning sprocket; and then re-secure the mounting.

The elevator chain supports a series of elevator paddles that move with the chain during operation of the elevator. The paddles pick up grain at the base of the elevator, convey it to the top thereof and then, by virtue of the loci of the paddles (that are dictated in turn by the shape of the chain) throw the grains outwardly at the top of the elevator. The trajectories of the grains are constrained by the interior walls of a hollow, concave elevator head that encloses the otherwise open upper end of the elevator.

The elevator head guides the grains to a bubble up auger that conveys the grains to the clean grain tank of the combine harvester.

In the flow path of the grains between the elevator and the bubble up auger it is known to install the sensor surface of a mass flow measuring device (meter) as disclosed in U.S. Pat. No. 5,952,584 or U.S. Pat. No. 5,959,218. Typically the walls of the elevator head act as a lead-in guide surface for guiding the grains into contact with the sensor surface.

The loci of the elevator paddles is arcuate in the vicinity of the top of the grain elevator. The top wall of the elevator head is generally of complementary shape to the loci of the paddles in this region. Consequently the spacing between the free edges of the paddles and the said wall is substantially constant, at least over a certain length of the top wall.

A proportion of the grain conveyed by the paddles falls through the gap between the paddle ends and the elevator head top wall. As a result of re-tensioning of the elevator chain in the manner aforesaid, this gap diminishes. Consequently the proportion of the grain falling off the paddles via the spacing after re-tensioning also diminishes, with the result that grain flows at a more controlled speed onto the sensor surface, than before the re-tensioning operation, because the grain is influenced less by grain moisture content or kernel size.

Such a reduction in the proportion of grain falling off the conveyor paddles causes a greater proportion of the conveyed grain to impact the sensor surface of the mass flow measuring device at a controlled speed. This in turn increases the average speed at which the grain reaches the sensor surface.

The mass flow measuring device is calibrated in part on the assumption that the grains will impact the sensor surface at a known speed. Clearly the aforementioned change in average speed of the grains invalidates the assumption and thereby reduces the accuracy of the mass flow measuring device following chain re-tensioning.

SUMMARY OF THE INVENTION

According to a first aspect of the invention, there is provided an elevator for bulk material having a hollow, upwardly extending elevator housing having respective lower and upper openings and substantially enclosing an endless, flexible conveyor for conveying bulk material. The bulk material entering the housing at the lower opening, to the upper opening. The elevator including a head assembly having a plurality of members secured together to define a hollow, rigid closure that closes the upper opening of the elevator housing. The elevator head supporting within the hollow, rigid closure a guide surface for guiding bulk material in the elevator head. The elevator head also includes supported within the hollow, rigid closure a sensor surface of a mass flow measuring device, towards which the guide surface guides bulk material following its elevation by the said conveyor and a rotatable drive transfer assembly for rotatably engaging and tensioning the flexible conveyor.

The elevator head includes a lever member extending laterally of the elevator beyond the sensor surface. The lever member being pivotably secured to a fulcrum that is fixed relative to the elevator housing, whereby on pivoting of the lever member about the fulcrum the elevator head and the components supported thereby move together. This permits adjustment of the tension in the conveyor without substantially altering the positions of the conveyor, the guide surface and the sensor surface relative to one another.

An advantage of this arrangement is that the gap between the paddle free edges and the elevator head does not change as a result of a chain re-tensioning operation. Consequently the accuracy of the mass flow measuring device is maintained.

Preferably the endless, flexible conveyor includes an endless chain supporting a series of bulk material elevator paddles that lift bulk material from the lower opening and project it towards the sensor surface at the said upper opening, the chain defining an upwardly extending ovaloid path of the said conveyor and being wrapped at the lower and upper ends of the ovaloid respectively around a drive sprocket; and a tensioning sprocket that constitutes the said rotatable drive transfer assembly, whereby, on upward pivoting of the elevator head, the tensioning sprocket increases the tension in the chain. These features advantageously suit the elevator of the invention to use in a combine harvester.

In preferred embodiments the elevator head includes a mounting door supporting a mass flow measuring device, the mounting door openably closing an aperture in the elevator head and including a perforation and having rigidly secured thereto a mass flow measuring device a component of which extends through the perforation whereby the sensor surface of the mass flow measuring device is supported within the said hollow, rigid closure; and the remainder of the mass flow measuring device is supported externally of the hollow, rigid closure. This arrangement advantageously ensures that only the sensor surface of the mass flow measuring device is exposed to the harsh environment within the elevator head.

The mounting door may preferably be pivotably secured to the elevator head whereby the door is moveable between a closed position in which the sensor surface lies within the hollow, rigid closure and an open position in which the sensor surface lies substantially or entirely outside the hollow, rigid closure. This configuration permits ready access to the sensor surface of the mass flow measuring device, for cleaning and maintenance such as replacement of a liner plate secured to the sensor member to define the sensor surface proper.

In particularly preferred embodiments the elevator includes a releasable detent for releasably securing the mounting door in its closed position. This is a simple, robust means of retaining the mounting door in its closed position.

The mass flow measuring device may take any of a number of different forms. One preferred form includes a rigid anchor member that is rigidly secured to the elevator head, a rigid mounting member having rigidly secured thereto a sensor surface assembly, a resiliently deformable connection; and a load cell connected in series in a load transferring circuit.

This form of measuring device is conveniently compact. The resiliently deformable connection and the load cell confer flexibility on an otherwise substantially rigid structure. Since there are two flexible components in the load transferring circuit the overall stiffness of the device may be controlled, by selecting the stiffness of the resiliently deformable connection and the load cell respectively.

Conveniently one part of the load cell is secured to the anchor member and the mass flow measuring device includes a rigid link interconnecting a further part of the load cell and the mounting member. Preferably the load cell and the rigid link pre-tension the resiliently deformable connection.

This advantageously ensures that even when no grain is flowing on the sensor surface the mass flow measuring device produces an output signal. This in turn facilitates the elimination of drift from the output of the measuring device at zero grain flow.

In the preferred form of mass flow measuring device the resiliently deformable connection and the load cell include respective axes of deformation that are non-coinciding in use of the grain elevator. This ensures that the stiffnesses of the load cell and resiliently deformable connection are additive, thereby assuring operation of the measuring device.

In the presently most preferred form of the mass flow measuring device the anchor member includes a through-going aperture and the rigid link extends through the said aperture to interconnect the load cell and the mounting member. This arrangement of components significantly assists in conferring compactness on the device.

Conveniently the anchor member, the resiliently deformable connection and the mounting member are formed integrally one with another. One way of achieving this configuration is to machine the anchor member, the resiliently deformable connection and the mounting member from a single block of a preferred metal.

The integral nature of the aforementioned components provides a pivot that is not substantially susceptible to the deleterious effects of wear and contamination with e.g. dust and grease. Also the natural frequency of the resiliently deformable connection may be carefully controlled during manufacture of the device. This is highly advantageous because for example the interior of a combine harvester is subject to significant vibration. The ability to tune the natural frequency of the resiliently deformable connection during manufacture helps to eliminate noise, arising from such vibration, from the resulting mass flow signal generated by the load cell.

In the preferred form of the mass flow measuring device the resiliently deformable connection functions as a pivot about which the moment generated by the force of grains on the sensor surface acts. For high sensitivity of the device the stiffness of the resiliently deformable connection is less than the stiffness of the load cell.

The sensor surface assembly of the mass flow measuring device preferably includes at least one rigid sensor support rigidly secured to the mounting member and extending therefrom to one side of the resiliently deformable connection; and a sensor member, including a sensor surface, secured to the sensor support, whereby the bulk flow of material on the sensor surface causes deflection of the resiliently deformable connection and the load cell.

Such a sensor support is conveniently sturdy and compact; and possesses a high natural frequency, thereby assisting to eliminate spurious vibrations from the output signal of the mass flow measuring device.

When the elevator includes a mounting door as aforesaid the or each sensor support extends through a through-going aperture in the mounting door, whereby in use of the elevator the sensor member lies on one side of the mounting door within the hollow closure; and substantially the remainder of the mass flow measuring device is spaced therefrom by the mounting door.

This advantageously allows only the sensor surface to be exposed to the harsh environment inside the elevator head.

In one form of the mass flow measuring device the or each sensor support additionally extends on the opposite side of the resiliently deformable connection, and has secured thereto a counterbalance mass counterbalancing the mass of the sensor member. This advantageously allows the moment contributed by the mass flow measuring device to be substantially zero, thereby permitting greater accuracy and ease of signal processing.

When the grain is projected from the elevator onto the sensor surface the grain flow tends to spread. Before the flow reaches the end of the sensor plate it tends to reach the side edges of the plate. Consequently the total flow is not detected by the measuring device over the entire length of the sensor surface.

The location and the amount of grain that flows off the sensor plate along the sides is dependent on the mass flow, crop type, moisture content of the grain and the slope of the machine on the sensor is mounted. These parameters can vary a lot in the conditions where the machine (such as a combine harvester) has to work.

Therefore a further, optional feature of the elevator head according to the invention is the inclusion in the hollow, rigid closure of a pair of mutually parallel sidewalls, that are spaced from one another to define the lateral boundaries of part of the travel of each said conveyor, opposed portions of said sidewalls being thickened in the vicinity of the trajectory of the projected bulk material. This arrangement avoids the aforementioned problem of the spreading of flow on the sensor surface.

A further, preferred feature of the sidewalls of the sensor surface includes thickening of the said opposed portions by plates of substantially the same shape and dimensions as the said opposed sidewall portions and secured to the said opposed sidewall portions. Conveniently the said lateral edges of the said sensor surface include protruding therefrom a plurality of walls that define boundaries to the lateral travel of bulk material on the sensor surface; and the plurality of walls are a pair of flat, parallel, mutually spaced walls upstanding from respective, opposed lateral edges of at least part of the sensor surface.

An alternative arrangement involves use of a chute of part-toroidal shape (i.e. a curved chute of semi-circular cross-section). This shape may avoid potential material build-up that could arise at the junction of a straight, upstanding wall with a flat sensor surface. However, the latter kind of sensor surface is simple to manufacture.

The invention is also considered to reside in a combine harvester including an elevator, as defined herein, located for elevating grain within the combine harvester.

In a particularly preferred form of combine harvester according to the invention the lever member of the elevator extends into the grain tank of the combine harvester, whereby the said fulcrum also lies in the said grain tank.

BRIEF DESCRIPTION OF THE DRAWINGS

There now follows a description of preferred embodiments of the invention, by way of non-limiting example, with reference being made to the accompanying drawings.

DETAILED DESCRIPTION OF THE INVENTION

The terms "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings". Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
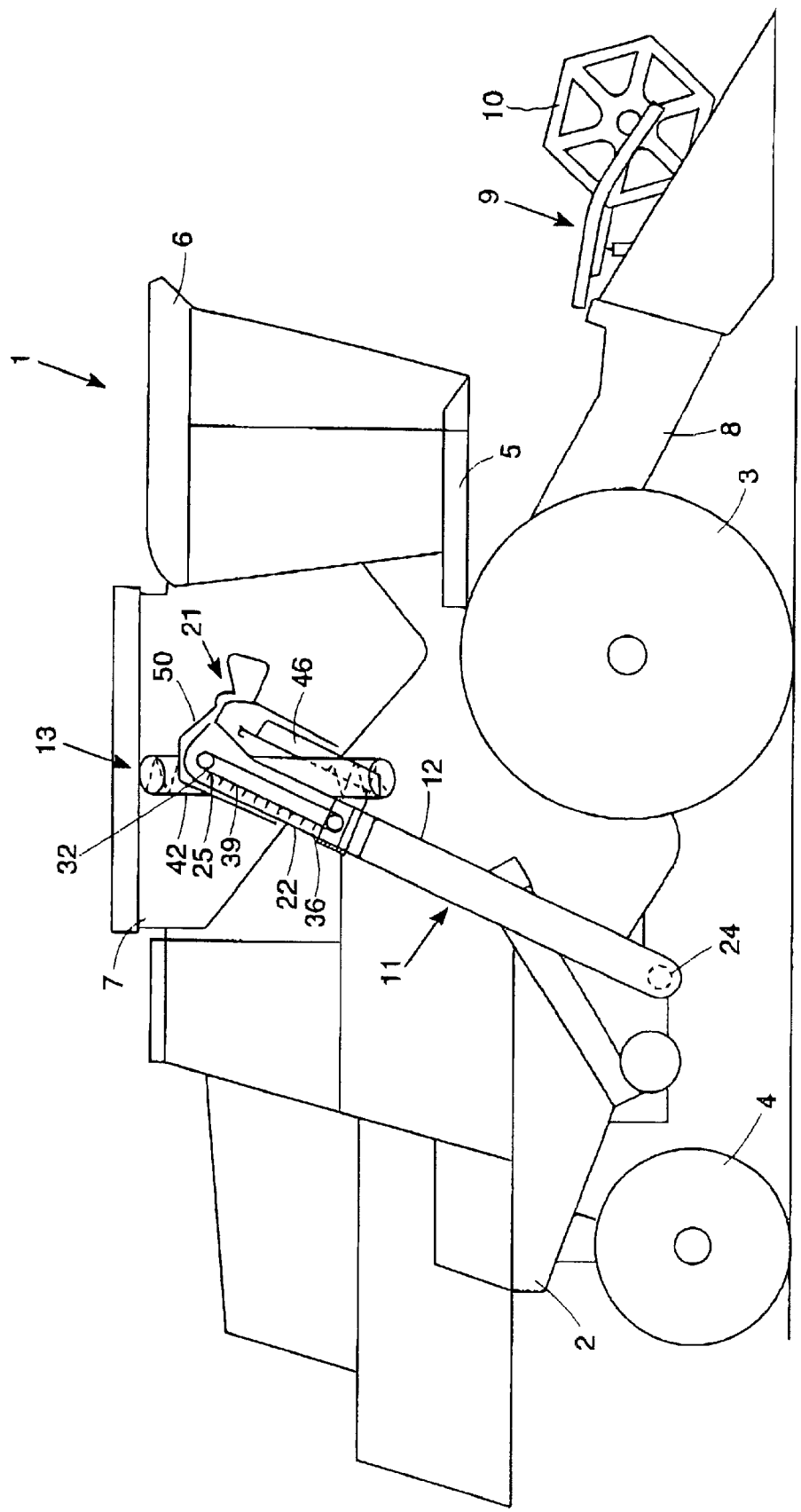
FIG. 1 is a side elevational view of a combine harvester embodying a mass flow rate metering device, in combination with a clean grain elevator according to the invention.

A typical combine harvester 1, as is shown in FIG. 1, comprises a main chassis or frame 2 supported on a front pair of traction wheels 3 and a rear pair of steerable wheels 4. Supported on the main chassis 2 are an operator's platform 5 with a cab 6, a grain tank 7, a threshing and separating mechanism (not shown), a grain cleaning mechanism (not shown) and an engine (also not shown). The engine provides the motive power for the various driven components of the machine as well as for the traction wheels 3. A conventional header 9 and straw elevator 8 extend forwardly of the main chassis 2. The header 9 and straw elevator 8 are pivotally secured to the chassis 2 for generally vertical movement which is controlled by extensible hydraulic cylinders. As the combine harvester 1 is propelled forwardly over a field with standing crop, the latter is severed from the stubble by a sickle bar on the header 9, whereafter a reel 10 and a header auger convey the cut crop to the straw elevator 8 which supplies it to the threshing and separating mechanism. The crop received within the threshing and separating mechanism is threshed and separated; that is to say, the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism (not shown) which comprises means to separate chaff and other impurities from the grain, and means to separate unthreshed crop material (tailings). Cleaned grain is then conveyed to the grain tank 7 by a clean grain conveyor 11 comprising a lower paddle type elevator 12 and an upper, so-called "bubble-up" auger 13. The tailings either may be returned via a tailings conveyor to the threshing mechanism for reprocessing, or otherwise may be reprocessed in a separate tailings rethresher and returned to the cleaning mechanism for a repeat cleaning action. The clean grain conveyor 11 is fitted with a mass flow measuring device, indicated generally at 21 in FIG. 1. The grain measuring device 21 is provided generally at the outlet opening 28 of the paddle-type elevator 12.

A similar mass flow measuring device may be provided on the tailings conveyor to measure the tailings flow rate. However, as both metering devices principally are identical, only the clean grain metering device will be described herein.

Figure 2:
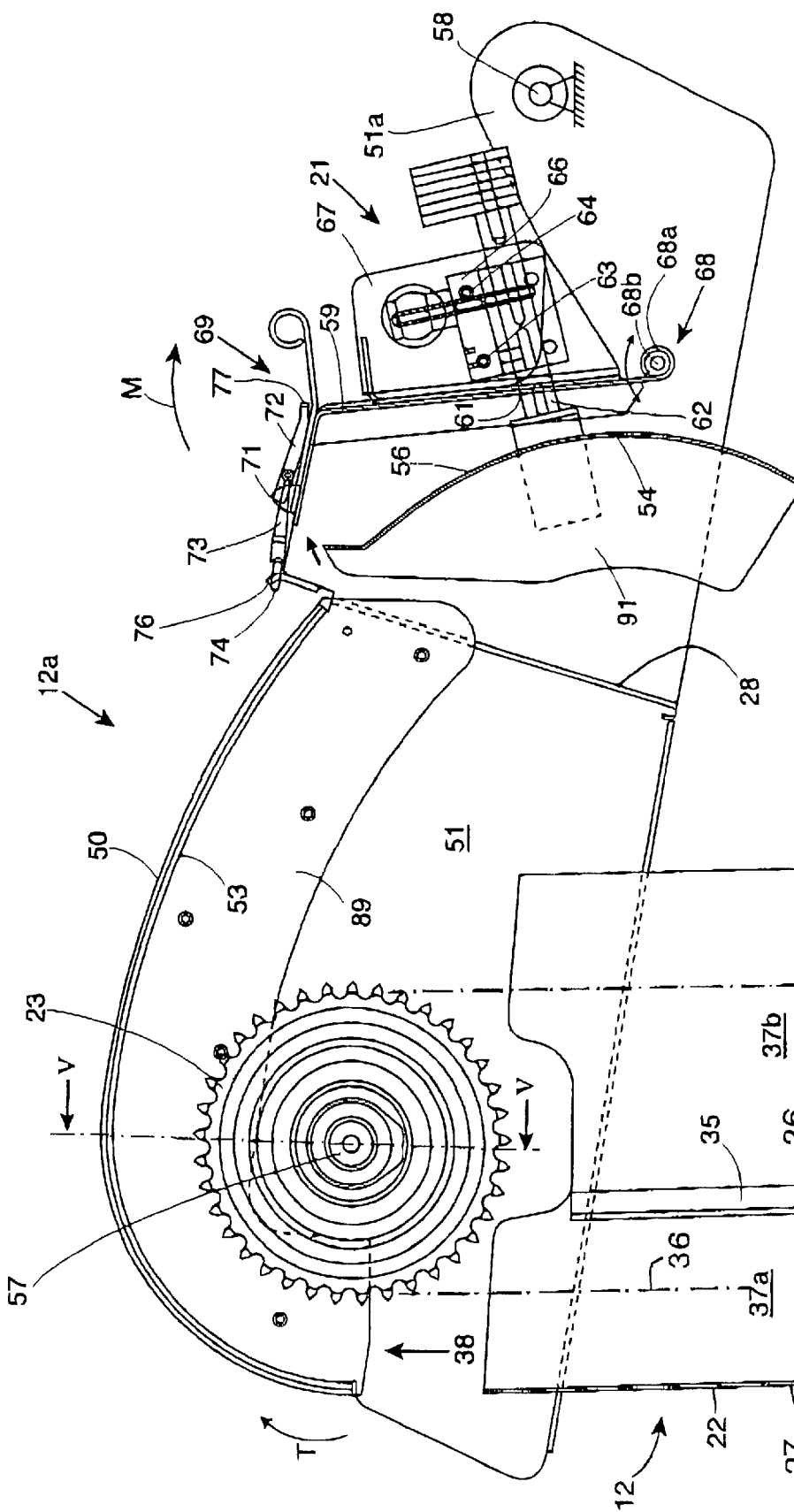
FIG. 2 is a side view on a larger scale of the head of the elevator of FIG. 1.

As shown in FIGS. 1 and 2 the paddle-type elevator 12 comprises an elongate housing 22 of generally rectangular cross section. Upper and lower sprockets, respectively 23 and 24, are mounted in the housing 22 in alignment with respect to each other for an endless paddle conveyor 25 to extend therearound. For clarity only a limited number of paddles is visible in FIG. 1 but in reality the paddles would be present at intervals along chain or belt 36 forming the flexible base of conveyor 25. The housing 22 has a pair of opposed sidewalls which extend parallel to the plane defined by the paddle conveyor 25. One of said sidewalls has a circular inlet opening generally coaxial with the lower sprocket 24. A transverse wall interconnects both sidewalls and arcuately extends around the lower sprocket 24. An outlet opening 28 is provided at the upper end of the elevator housing 22. Outlet opening 28 is provided in an elevator head 12a, described in more detail below, that (apart from opening 28) closes the open, upper end of housing 22.

The paddle conveyor 25 comprises an endless chain 36 on which the paddles 32 are mounted at regular intervals on pairs of angled brackets carried by the appropriate chain links in a manner described in detail in U.S. Pat. No. 5,736,652. Each paddle 32 is composed of a flexible material, which is nevertheless sufficiently rigid for the intended load carrying function. Each paddle 32 is spaced from the two opposed sidewalls 26 and from the transverse interconnecting wall 27. However, each paddle 32 is in sliding contact with an intermediate wall 35 which divides the operative and return runs 37a, 37b of the elevator 12. The paddle conveyor 25 is driven in the direction 38. In operation, the paddles 32 convey grain through the operative run 36 along the intermediate wall 35 and finally discharge said grain along the curved section 53 and through the outlet opening 28.

Grain, which is elevated by the paddle-type elevator 12, is transferred via an outlet 46 of the head 12a of elevator 12, which will be described in more detail hereafter, to the "bubble-up" auger 13, which is inclined inwardly of the machine and has a discharge end generally above the centre of the grain tank 7. The "bubble-up" system 13 is known per se.

Sprocket 23 is driven, via chain 36, from the vehicle engine, the output of which is speed stabilised.

FIG. 2 shows the elevator head assembly 12a in more detail. The chain 36 and paddles 32 have been omitted for clarity.

Figure 4:
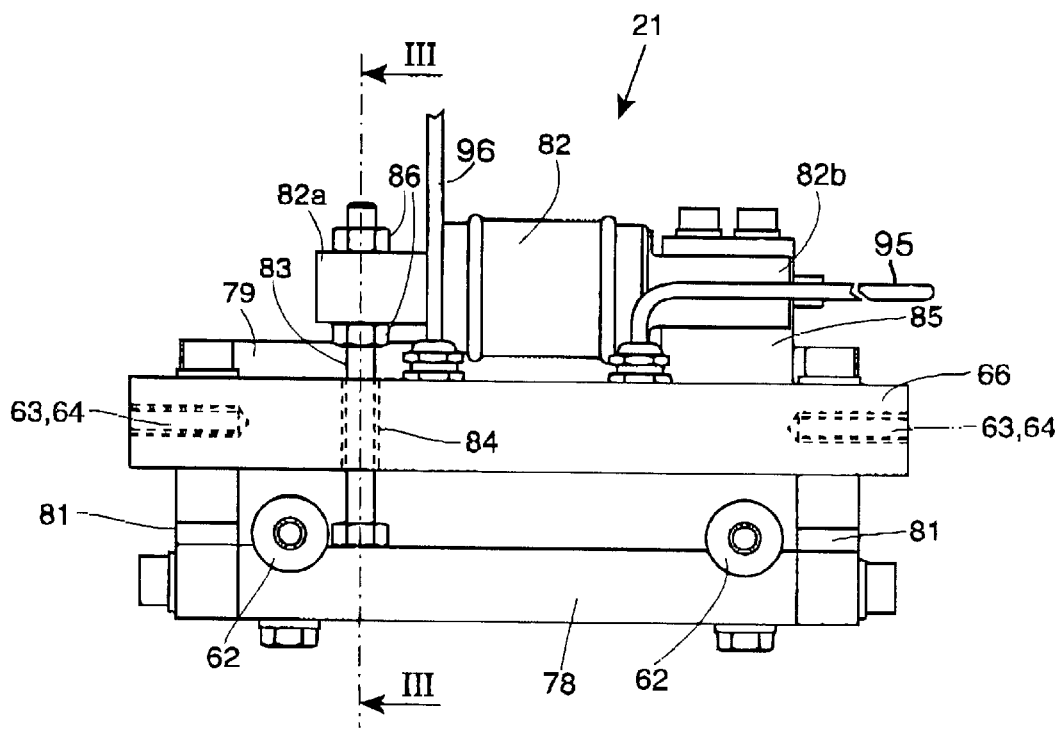
FIG. 4 is a a front view of the measuring device of FIG. 3.
Figure 5:
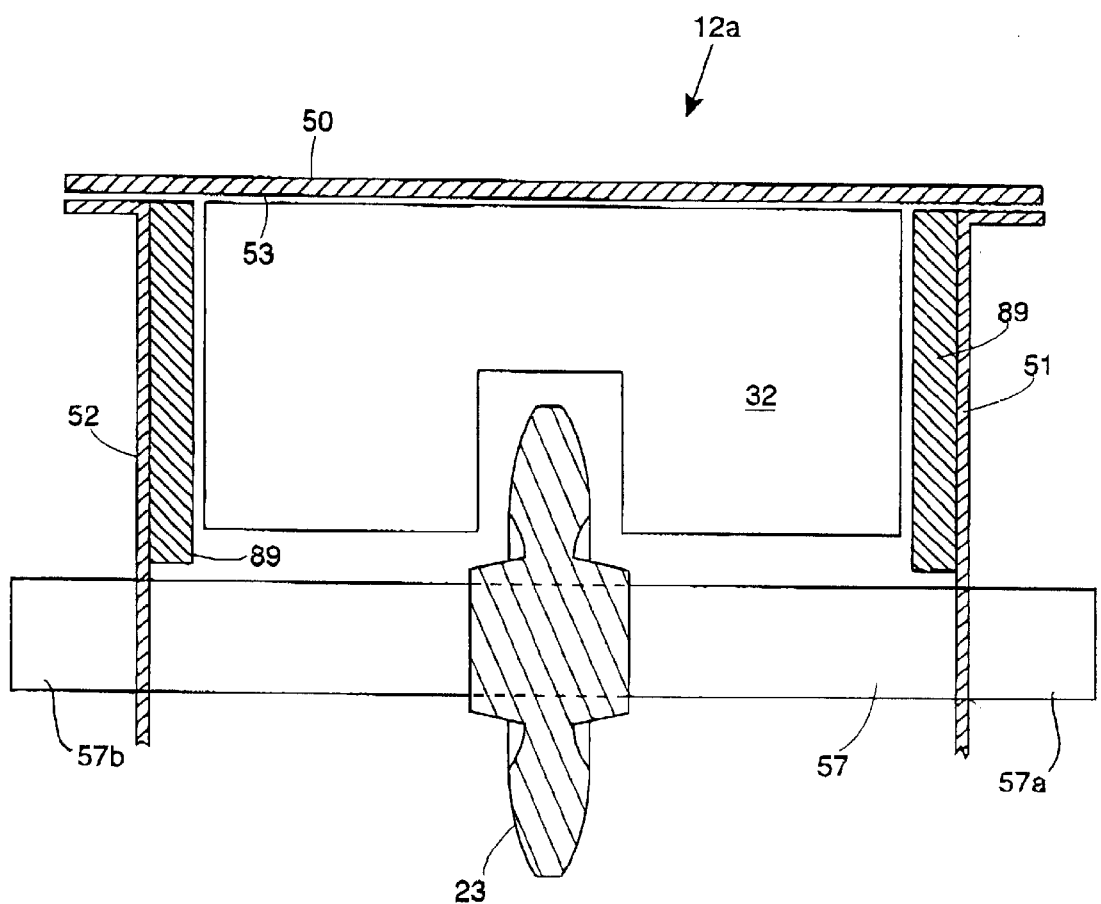
FIG. 5 is a transverse cross-sectional view on arrows V—V of the head of the grain elevator shown in FIG. 2, in the vicinity of the top.

Head assembly 12a includes a top plate 50 and a pair of opposed sidewalls, of which one, 51, is visible in FIG. 2 and both (51 and 52) are visible in FIG. 4. These components are secured together e.g. by welding in order to define a rigid closure that is hollow on its side facing the interior of elevator 12.

Within the hollow, rigid closure the underside of top plate 50 acts as a guide surface 53 for guiding bulk material (e.g. grains, kernels or other particles) in the elevator head 12a. More specifically, guide surface 53 guides grains, projected from the paddles 32 at or near the top of their travel, towards the sensor surface 54 of a sensor member 56 forming part of the mass flow measuring device 21.

The sensor surface 54 is supported within the hollow portion of elevator head 12a, in a manner described below.

Sprocket 23 and its associated rotatable mounting shaft 57, having part of chain 36 wrapped around part of its outer periphery in drive-transforming engagement therewith, act as a drive transfer assembly for rotatably engaging the chain 36 of paddle conveyor 25.

Shaft 57 and sprocket 23 are secured together (by means of a conventional slot and drive key arrangement; or a series of splines) for co-rotation. The free ends 57a, 57b of shaft 57 are rotatably journalled in the respective sidewalls 51, 52 of elevator head 12a by means of roller bearings that is well know in the art. The arrangement is shown schematically in FIG. 4.

At least one, and in practice both, of the sidewalls 51, 52 extend laterally of the vicinity of guide surface 53 to define a pair of spaced lever members of which one, 51a, is visible in FIG. 2. The lever members thus defined are rigidly connected to the remainder of the elevator head assembly 12a.

Each of the lever members is pivotably secured, as illustrated by lever member 51a in FIG. 2 about a fulcrum represented schematically by reference numeral 58 in FIG. 2.

Fulcrum 58 may in practice be a horizontally extending, circular section bar that is fixed relative to the combine harvester frame 2 and hence relative to elevator housing 12. The bar is journalled at two spaced locations in mutually aligned apertures in the lever member extensions of the respective sidewalls 51, 52. As a result the sidewalls 51, 52 and all components of the head assembly 12a are pivotably rotatable about fulcrum 58.

Fulcrum 58 is offset as far as possible to the right of the apparatus as viewed in FIG. 2, in order to minimise the change in angular orientation of the elevator head 12a when adjusting the tension in the chain 36.

Since sprocket shaft 57 is journalled in the walls 51, 52, pivoting of elevator head assembly 12a in the direction of arrow T in FIG. 2 causes the sprocket 23 to rise with the head assembly 12a and increase the tension in the chain 36. During this action the shaft 57 is fixed relative to guide surface 53 and sensor surface 54. Consequently the elevator head assembly 12a provides a solution to the problem in the prior art of chain tension adjustments affecting the accuracy of the mass flow measuring device.

The elevator head assembly 12a includes a generally L-profile mounting door 59 whose L-profile generally encloses the concave outer surface of sensor member 56.

Mounting door 59 is rigid and has secured thereto the components making up the mass flow measuring device 21.

Mounting door 59 includes formed therein a through-going aperture 61 whereby a support 62, for the sensor member 56, passes therethrough. The result of this arrangement is that the sensor member 56 lies on one side of mounting door 59, within the hollow interior of elevator head assembly 12a; while the remainder of the mass flow measuring device 21 lies externally of the hollow interior, on the other side of mounting door 59. Consequently only the sensor member 56 is in use of the elevator 12 exposed to the harsh environment of the interior of head assembly 12a, where dust, vibration and the substantial force of the grain flow might damage less robust parts of the mass flow measuring device 21.

In the embodiment shown measuring device 21 is secured to mounting door 59 by virtue of bolting, at locations 63 and 64, of an anchor member 66 (described in more detail below) between a pair of mounting plates 67 upstanding from and rigidly secured to the mounting door 59. However, other equivalent securing means for the measuring device 21 may readily be devised and are within the scope of the invention.

At its lowermost end the mounting door is pivotably secured at 68 to the lever members 51 a forming part of head assembly 12a.

The pivot 68 is in the preferred embodiment formed by a rolled bead 68a defining a hollow, horizontally extending cylinder that journals a rod 68b that is fixed relative to the lever members 51a. The result is that mounting door 59 is pivotably moveable between a closed position as shown in FIG. 2; and an open position.

In the closed position shown the sensor member is presented for use, whereby the guide surface 53 serves as a lead-in guide that guides the flow of grains onto the sensor surface.

In its open position the mounting door 59 moves as signified by arrow M to expose the sensor surface 54 for maintenance and/or cleaning.

Maintenance of the sensor surface 54 may include e.g. replacement of a coated, stainless steel, nylon or similar material surface liner (not visible in the drawings) that protects the material of sensor member 56 from damage and/or abrasion resulting from the flow of grains.

Alternatives to the arrangement of pivot 68 will readily occur to those skilled in this art, and are within the scope of the invention.

Mounting door 59 is securable in its closed position by means of a detent 69 comprising a pivot 71 upstanding from the top of door 59 and having secured thereto one end of a detent lever 72.

Part way along its length detent lever 72 has pivotably secured thereto one end of a pushrod 73 the free end of which terminates in a hook 74.

When the detent 69 is securing the mounting door 59 in its closed position hook 74 engages an upstanding tang 76 formed in the top plate 50 of head assembly 12a.

Lifting of the free end of detent lever 72 causes pushrod 73 to push hook 74 out of engagement with tang 76. Pushrod 73 may then be pivoted clear of tang 76 to permit opening of mounting door 59.

The free end of detent lever terminates in a hand grip 77 to facilitate opening and closing of detent 69 and pivoting of mounting door 59. Closing of the detent is in essence the reverse of the opening process.

Mass flow measuring device 21 comprises (FIG. 3), as main components the rigid anchor member 66; a rigid mounting member 78 that supports, via sensor support members 62, the sensor member 56 and a counterbalance mass 79; a resiliently deformable connection 81 and a load cell 82.

The anchor member 66, mounting member 78, resiliently deformable connection 81 and load cell 82 are connected such that a load applied to or acting via any one of the four said components is transmitted to the remaining three. This is achieved by virtue of the components 66, 78, 81 and 82 being series interconnected in a load transferring circuit.

Figure 3:
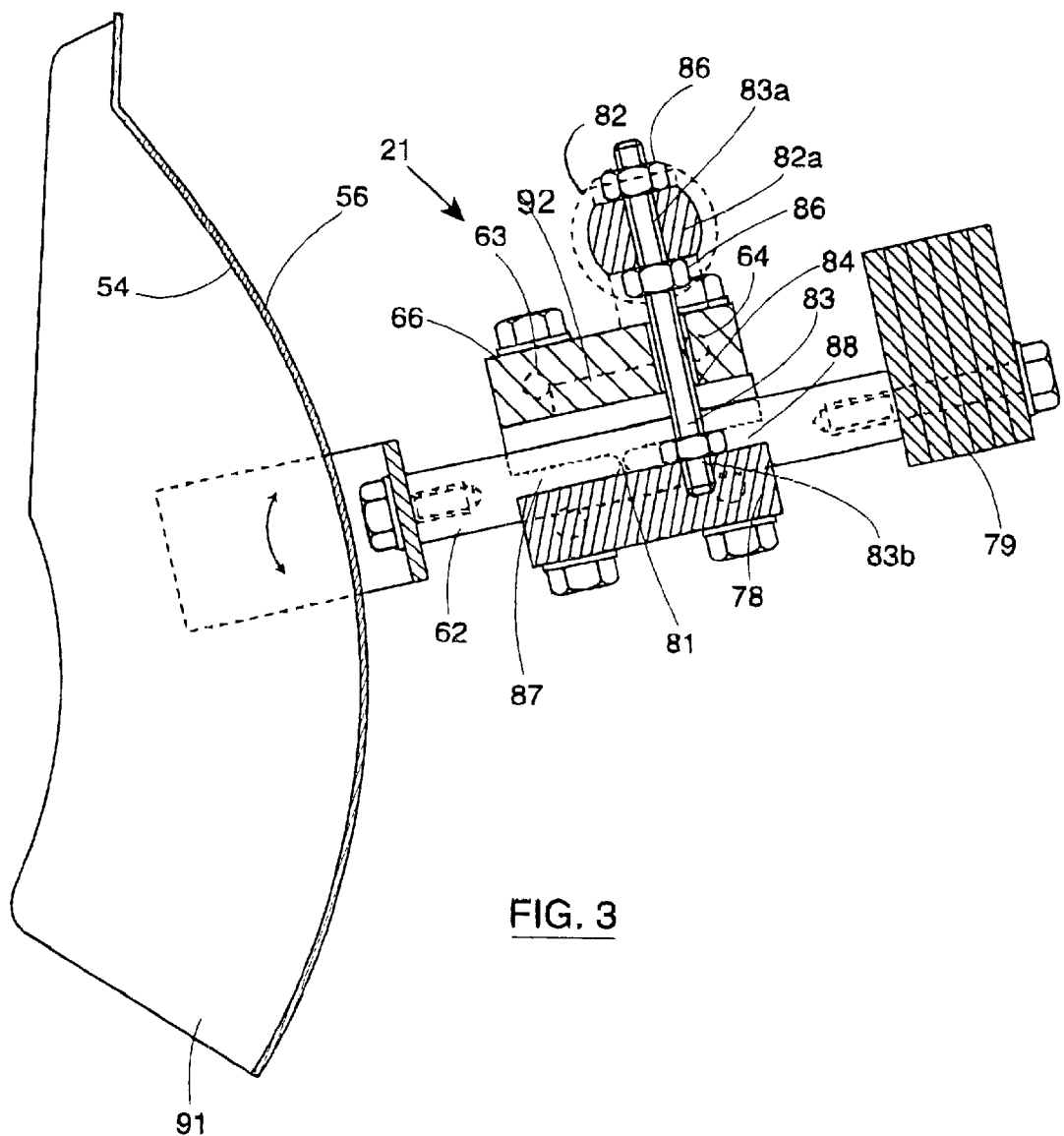
FIG. 3 is a side elevational view, on a still larger scale, of the mass flow measuring device forming part of the invention.

The load cell 82 is in the preferred embodiment an elongate, substantially cylindrical device that is viewed from one end 82a in FIG. 3. The end of load cell 82 that is not visible in FIG. 3 is secured directly to the upper surface of anchor member 66; while visible end 82a is connected to mounting member 78 by means of a rigid strut or link 83.

In the preferred embodiment of the invention strut 83 is an elongate threaded screw secured at its upper end in a correspondingly threaded bore 83a in load cell 82 and at its lower end in a correspondingly threaded bore 83b in mounting member 78. The anchor member 66 includes a through going aperture 84 through which the strut 83 passes, thereby conferring compactness on the arrangement.

The mounting member 78 and the anchor member 66 are pivotable relative to one another about connection 81. Since anchor member 66 is as aforesaid bolted at 63 and 64 to mounting plates 67 (and hence, indirectly, to mounting door 59) any force exerted in use of the elevator head on sensor surface 54 causes mounting member 78 to pivot, against the resilience of connection 81, relative to anchor member 66.

However, the load transferring, series connection of the primary components of device 21 means that any such forces are also resisted by the torsional stiffness of load cell 82, by virtue of load transfer via strut 83. The point of action of such forces on strut 83 is offset laterally from connection 81 in order to allow such load transfer to the load cell 82. Consequently the axis of bending of connection 81 does not coincide with the torsional axis of load cell 82.

The presence of two resiliently deformable components (i.e. connection 81 and load cell 82) confers versatility on the design of the device 21, since for example the overall resistance of the forces acting on sensor surface 54 may be altered by replacing load cell 82 with another load cell of different bending rigidity. By this means it is possible to adjust e.g. the sensitivity of measuring device 21.

The arrangement of the device offers a further advantage in that strut 83 may be adjusted (by selecting the extent to which it is screwed into apertures 83a and 83b) to pretension the load transferring circuit. This ensures that the load cell 82 always gives a positive voltage signal, even when there is no load acting on the sensor surface 54. This in turn is advantageous, when processing the output signal of load cell 82, in cancelling the effects of any drift in the said signal in the no-load condition.

The underside of anchor member 66 includes formed therein a recess 86 that contains electronic components including a power supply, signal input and output filters and a scaling amplifier for carrying out initial processing of the signal from load cell 82. The electronic components are connected to load cell 82 by wires (not shown in FIG. 3) and constitute an advantageously compact arrangement. An output lead (also not visible in the drawings) connects the scaling amplifier output to e.g. a control microprocessor in the combine harvester, whereby to permit further processing of the load cell signal.

As is perhaps best seen in FIG. 3, the anchor member 66, connection 81 and mounting member 78 are formed integrally with one another. This is preferably achieved by machining two parallel, coaxial slots 87 and 88 towards one another from opposite ends of a block of preferred metal, until only a comparatively small central land defining resiliently deformable connection 81 remains.

Sensor member 56 is secured to mounting member by in practice a pair of sensor supports 62 that are spaced from one another in a direction perpendicular to the plane of FIG. 3.

Each sensor support 62 is rigidly secured to mounting member 78. Sensor member 56 is secured to one free end of the supports 62, laterally offset to one side of measuring device 21 as shown, whereby sensor member 56 may lie within the interior of elevator head 12a as aforesaid.

Each sensor support 62 also extends beyond the bulk of device 21, on the opposite side to sensor member 56, and supports at its other free end a counterbalance mass 79 that in practice is a series of plates bolted together.

The counterbalance mass 79 confers a net zero moment about connection 81 in the no-load condition.

The use of a laminated counterbalance mass 79 confers a degree of adjustability on the magnitude of the counterbalancing moment.

The sensor supports 62 are in the preferred embodiment constituted as rigid, substantially solid cylinders that have a comparatively high natural frequency. This minimises the effects of harmonic vibration deriving from the many oscillating components in a combine harvester.

Further, optional features of the elevator head 12a will now be described with reference to FIGS. 2 and 4.

As previously noted the elevator head 12a includes a pair of spaced sidewalls 51, 52.

Each sidewall 51, 52 has secured thereto, over substantially its entire length adjacent the top plate 50, a thickening plate 89.

Each thickening plate 89 is arcuate to conform to the shape of the part of each sidewall to which it is secured; and may be made e.g. from nylon or a similar material.

The purpose of the plates 89 is to solve the problem that when grain is projected from the elevator towards a sensor plate the grain flow velocity differs dependent on the size of the grain kernels. This is caused by the gaps between elevator paddles and the elevator housing. With smaller grains like canola, the overall velocity of the grain package is smaller since part of the flow escapes (flows off the paddles) when the grain is thrown out of the elevator. Larger kernels, like corn, are too thick and a much smaller portion is thrown out with a lower velocity resulting in a higher average velocity of the grain package. The speed will directly influence the flow sensor reading which is placed at the elevator outlet. As a result the sensor signal-mass flow relation becomes dependent on the kernel size.

As a result of including the thickened portions the mass flow relation is less dependent on the grain kernel size, than would otherwise be the case.

The opposed lateral edges of the sensor member 56 are bounded by respective upstanding, arcuate sidewalls 91 only one of which is visible in FIG. 3.

The sidewalls 91 extend into the hollow interior of elevator head 12a from the sensor surface 54.

The sidewalls 91 solve the aforementioned problems associated with spreading of the mass flow of grain on the sensor surface 54.

The boundary between the top of elevator housing 12 and the lower edges of the walls of elevator head 2a preferably is sealed to prevent egress of grains and dust. This may be achieved through use of a per se known sliding seal.

In use of the invention the elevator 12 is operated to lift grain. This may be e.g. to elevate grain from a low level to a higher level in a hopper or silo; or to lift grain, continuously exiting the grain cleaner of a combine harvester while the harvester travels forwardly to harvest crop. Another possibility is for the elevator 12 to function to convey tailings or straw in a combine harvester.

Regardless of the precise nature of the bulk flow, as a result of being continuously driven by chain 36 the paddles 32 repeatedly launch packets of bulk flow particles within the interior of elevator head 12a, towards sensor surface 54. The flow of particle is substantially continuous.

The force exerted by the bulk flow on the sensor surface 54 causes pivoting of mounting member 78 relative to anchor member 66, against the resilience of connection 81 and load cell 82.

Resulting deflection (bending) of the load cell 82 generates a signal that is proportional to the mass flow rate of the bulk material. Processing of the signal as aforesaid can give rise to e.g. a digital read out of the mass flow rate, or may cause a control action such as adjustment of the speed of the combine harvester.

The various features of the apparatus described herein enhance the accuracy of the mass flow measurement during such operations.

It will be obvious to those skilled in the art that various changes may be made without departing from the scope of the invention and the invention is not to be considered limited to what is illustrated in the drawings and described in the specification.

What is claimed is:

1. An elevator for bulk material, comprising:
a hollow, upwardly extending elevator housing having respective lower and upper openings and substantially enclosing an endless, flexible conveyor for conveying bulk material, entering the housing at the lower opening, to the upper opening, the elevator including a head assembly having a plurality of members secured together to define a hollow, rigid closure that closes the upper opening of the elevator housing, the elevator head supporting within the hollow, rigid closure a guide surface for guiding bulk material in the elevator head, said elevator head also includes supported within the hollow, rigid closure:
a sensor surface of a mass flow measuring device, towards which the guide surface guides bulk material following its elevation by the said conveyor; and
a rotatable drive transfer assembly for rotatably engaging and tensioning the flexible conveyor, the elevator head including a lever member extending laterally of the elevator beyond the sensor surface, the lever member being pivotably secured to a fulcrum that is fixed relative to the elevator housing, whereby on pivoting of the lever member about the fulcrum the elevator head and the components supported thereby move together, thereby permitting adjustment of the tension in the conveyor without substantially altering the positions of the conveyor, the guide surface and the sensor surface relative to one another.

2. The elevator described in claim 1 wherein the endless, flexible conveyor further comprises an endless chain supporting a series of bulk material elevator paddles that lift bulk material from the lower opening and project it towards the sensor surface at the said upper opening, the chain defining an upwardly extending ovaloid path of the said conveyor and being wrapped at the lower and upper ends of the ovaloid respectively around a drive sprocket; and a tensioning sprocket that constitutes the said rotatable drive transfer assembly, whereby, on upward pivoting of the elevator head, the tensioning sprocket increases the tension in the chain.

3. The elevator described in claim 2 wherein the elevator further comprises a mounting door supporting a mass flow measuring device, the mounting door openably closing an aperture in the elevator head and including a perforation and having rigidly secured thereto a mass flow measuring device a component of which extends through the perforation whereby the sensor surface of the mass flow measuring device is supported within the said hollow, rigid closure; and the remainder of the mass flow measuring device is supported externally of the hollow, rigid closure.

4. The elevator described in claim 3 wherein the mounting door is pivotably secured to the elevator head whereby the door is moveable between a closed position in which the sensor surface lies within the hollow, rigid closure and an open position in which the sensor surface lies substantially or entirely outside the hollow, rigid closure.

5. The elevator described in claim 4 further comprising a releasable detent for releasably securing the mounting door in its closed position.

6. The elevator described in claim 5, wherein the mass flow measuring device further comprises:

a rigid anchor member that is rigidly secured to the elevator head;

a rigid mounting member having rigidly secured thereto a sensor surface assembly;

a resiliently deformable connection; and a load cell connected in series in a load transferring circuit.

7. The elevator described in claim 6 wherein one part of the load cell is secured to the anchor member and wherein the mass flow measuring device includes a rigid link interconnecting a further part of the load cell and the mounting member.

8. The elevator described in claim 7 wherein the load cell and rigid cell and rigid link pre-tension the resiliently deformable connection.

9. The elevator described in claim 8 wherein the resiliently deformable connection and the load cell include respective axes of deformation that are non-coinciding in use of the grain elevator.

10. The elevator described in claim 8, wherein the anchor member includes a through-going aperture and the rigid link extends through the said aperture to interconnect the load cell and the mounting member.

11. The elevator described in claim 10, wherein the anchor member, the resiliently deformable connection and the mounting member are formed integrally one with another.

12. The elevator described in claim 11 wherein the sensor surface assembly includes at least one rigid sensor support rigidly secured to the mounting member and extending therefrom to one side of the resiliently deformable connection; and a sensor member, including a sensor surface, secured to the sensor support, whereby the bulk flow of material on the sensor surface causes deflection of the resiliently deformable connection and the load cell.

13. The elevator described in claim 12, wherein the sensor support extends through a through-going aperture in the mounting door, whereby in use of the elevator the sensor member lies on one side of the mounting door within the hollow closure; and substantially the remainder of the mass flow measuring device is spaced therefrom by the mounting door.

14. The elevator described in claim 13 wherein the sensor support additionally extends on the opposite side of the resiliently deformable connection, and has secured thereto a counterbalance mass counterbalancing the mass of the sensor member.

15. The elevator described in claim 14, wherein the hollow, rigid closure includes a pair of mutually parallel sidewalls, that are spaced from one another to define the lateral boundaries of part of the travel of each said conveyor, opposed portions of said sidewalls being thickened in the vicinity of the trajectory of the projected bulk material.

16. The elevator described in claim 15 wherein the said opposed portions are thickened by plates of substantially the same shape and dimensions as the said opposed sidewall portions and secured to the said opposed sidewall portions.

17. The elevator described in claim 16, wherein the lateral edges of the said sensor surface include protruding therefrom a plurality of walls that define boundaries to the lateral travel of bulk material on the sensor surface.

18. The elevator described in claim 17 wherein the plurality of walls are a pair of flat, parallel, mutually spaced walls upstanding from respective, opposed lateral edges of at least part of the sensor surface.

19. The elevator described in claim 17 wherein the sensor surface is of semi-toroidal shape, whereby to define the said protruding walls.

20. The elevator described in claim 19 wherein the elevator in located in a combine harvester to elevate grain within said harvester.

21. The elevator described in claim 20 wherein the said lever member extends into the grain tank of the combine harvester, whereby the said fulcrum also lies in the said grain tank.

\* \* \* \* \*